United States Patent
Giesken et al.

(10) Patent No.: US 7,383,594 B1
(45) Date of Patent: Jun. 10, 2008

(54) TOILET OVERFLOW PREVENTION SYSTEM

(76) Inventors: Chris Giesken, 12351 S. Crest Dr., Olathe, KS (US) 66061; Amy Giesken, 12351 S. Crest Dr., Olathe, KS (US) 66061

( * ) Notice: Subject to any disclaimer, the term of this patent is extended or adjusted under 35 U.S.C. 154(b) by 0 days.

(21) Appl. No.: 11/421,714

(22) Filed: Jun. 1, 2006

Related U.S. Application Data

(63) Continuation of application No. 10/426,201, filed on May 1, 2003, now abandoned.

(51) Int. Cl.
*E03D 11/18* (2006.01)
(52) U.S. Cl. .......................................................... 4/427
(58) Field of Classification Search .................... 4/427, 4/420
See application file for complete search history.

(56) References Cited

U.S. PATENT DOCUMENTS

| | | | | |
|---|---|---|---|---|
| 620,352 | A * | 2/1899 | O'Brien | 4/348 |
| 988,787 | A * | 4/1911 | Kimble | 4/427 |
| 2,778,029 | A * | 1/1957 | Young | 4/427 |
| 3,262,132 | A * | 7/1966 | Mann | 4/427 |
| 4,041,557 | A | 8/1977 | Ringler | |
| 4,402,093 | A | 9/1983 | Luker et al. | |
| 4,607,658 | A | 8/1986 | Fraser et al. | |
| 5,940,899 | A | 8/1999 | Mankin et al. | |
| 6,016,577 | A | 1/2000 | Cooley | |
| 6,032,303 | A | 3/2000 | Schmidt | |
| 6,052,841 | A | 4/2000 | Mankin et al. | |
| 6,058,519 | A | 5/2000 | Quintana | |
| 6,178,569 | B1 | 1/2001 | Quintana | |
| 6,263,520 | B1 | 7/2001 | Song | |
| 6,367,096 | B1 | 4/2002 | Quintana | |

FOREIGN PATENT DOCUMENTS

CH 10222 * 3/1895

* cited by examiner

*Primary Examiner*—Charles E. Phillips
(74) *Attorney, Agent, or Firm*—Schmeiser, Olsen & Watts LLP

(57) ABSTRACT

A toilet overflow prevention system is provided and is incorporated with an otherwise standard toilet wherein the toilet bowl thereof is incorporated with an overflow inlet portal defined as a generally circular opening integrally formed within the left side of the concave inner wall of the toilet bowl. The overflow inlet portal provides passage to an auxiliary waste drain outlet which extends downward through toilet bowl frontal to the primary waste discharge pipe, and through the stool portion of the standard toilet, under which connection is made to an auxiliary waste outlet piping being in fluid communication with the primary waste discharge pipe. A reticulated grate element is mounted transversely atop the circular opening in order to trap debris contained within toilet bowl so as to facilitate ascension and discharge of water through auxiliary waste drain outlet, hence preventing unpleasant overflow.

7 Claims, 3 Drawing Sheets

TOILET OVERFLOW PREVENTION SYSTEM

This application is a continuation of the earlier patent application entitled "TOILET OVERFLOW PREVENTION SYSTEM," Ser. No. 10/426,201, filed May 1, 2003, now abandoned, the disclosures of which are hereby incorporated herein by reference.

BACKGROUND OF THE INVENTION

1. Field of the Invention

The present invention relates generally to toilet flushing systems and, more particularly, to a toilet overflow prevention system.

2. Description of the Related Art

Most everyone has at one time or another dealt with the common occurrence of a clogged toilet. Toilet bowls may become clogged due to any number of reasons. Most often, the waste line becomes obstructed because of excessive waste matter, toilet tissue, or the flushing of inappropriate articles. The undesired result is typically toilet overflow which can lead to substantial property damage and unsanitary conditions.

Accordingly, a need has arisen for a means by which excessive toilet overflow can be effectively discharged through an auxiliary passage so as to prevent an overflow from occurring in a manner which is quick, easy, and efficient. The development of the toilet overflow prevention system fulfills this need.

A search of the prior art did not disclose any patents that read directly on the claims of the instant invention; however, the following references were considered related.

The following patents disclose systems for detecting and preventing toilet overflows via sensor devices:

U.S. Pat. No. 6,367,096 BI, issued in the name of Quintana; U.S. Pat. No. 6,052,841, issued in the name of Mankin et al; U.S. Pat. No. 6,016,577, issued in the name Cooley U.S. Pat. No. 6,178,569 BI, issued in the name of Quintana; U.S. Pat. No. 6,058,519, issued in the name of Quintana; and U.S. Pat. No. 5,940,899, issued in the name of Mankin et al.

The following patents disclose water volume control valve devices operative within a toilet water tank for preventing overflow of a toilet:

U.S. Pat. No. 6,263,520 BI, issued in the name of Song; U.S. Pat. No. 6,032,303, issued in the name of Schmidt; and U.S. Pat. No. 4,402,093, issued in the name of Luker et al.

U.S. Pat. No. 4,041,557, issued in the name of Ringler, discloses an electrical toilet flushing device with overflow inhibitor.

And, U.S. Pat. No. 4,607,658, issued in the name of Fraser et al., discloses a water level control device for automatically controlling the water level in a basin, such as a bathtub.

Consequently, a need has been felt for a means by which excessive toilet overflow can be effectively discharged through an auxiliary passage so as to prevent an overflow from occurring in a manner which is quick, easy, and efficient.

SUMMARY OF THE INVENTION

Therefore, it is an object of the present invention to provide a system by which excessive toilet overflow can be effectively and efficiently discharged through an auxiliary passage.

It is another object of the present invention to provide an overflow inlet portal integrally formed within the inner wall of a toilet bowl which provides passage to an auxiliary waste drain outlet.

It is another object of the present invention to provide an auxiliary waste drain outlet which extends downward through toilet bowl, and frontal to the primary waste discharge pipe.

It is another object of the present invention to provide an auxiliary waste drain outlet being connected to an auxiliary waste outlet piping.

It is another object of the present invention to provide an auxiliary waste outlet piping being in fluid communication with the primary waste discharge pipe.

It is another object of the present invention to provide a reticulated grate element mounted transversely atop the overflow inlet portal in order to trap debris contained within the toilet bowl.

The use of the present invention provides an effective means for preventing toilet overflow in a manner which is quick, easy, and efficient.

Briefly described according to one embodiment of the present invention, a toilet overflow prevention system is provided. The system is comprised of an otherwise standard toilet wherein the toilet bowl thereof is incorporated with an overflow inlet portal defined as a generally circular opening integrally formed within the left side of the concave inner wall of the toilet bowl. The overflow inlet portal provides passage to an auxiliary waste drain outlet which extends downward through toilet bowl frontal to the primary waste discharge pipe, and through the stool portion of the standard toilet, under which connection is made to an auxiliary waste outlet piping being in fluid communication with the primary waste discharge pipe.

A reticulated grate element is mounted transversely atop the circular opening in order to trap debris contained within toilet bowl so as to facilitate ascension and discharge of water through auxiliary waste drain outlet, hence preventing unpleasant overflow.

The use of the present invention provides an effective means for preventing toilet overflow in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
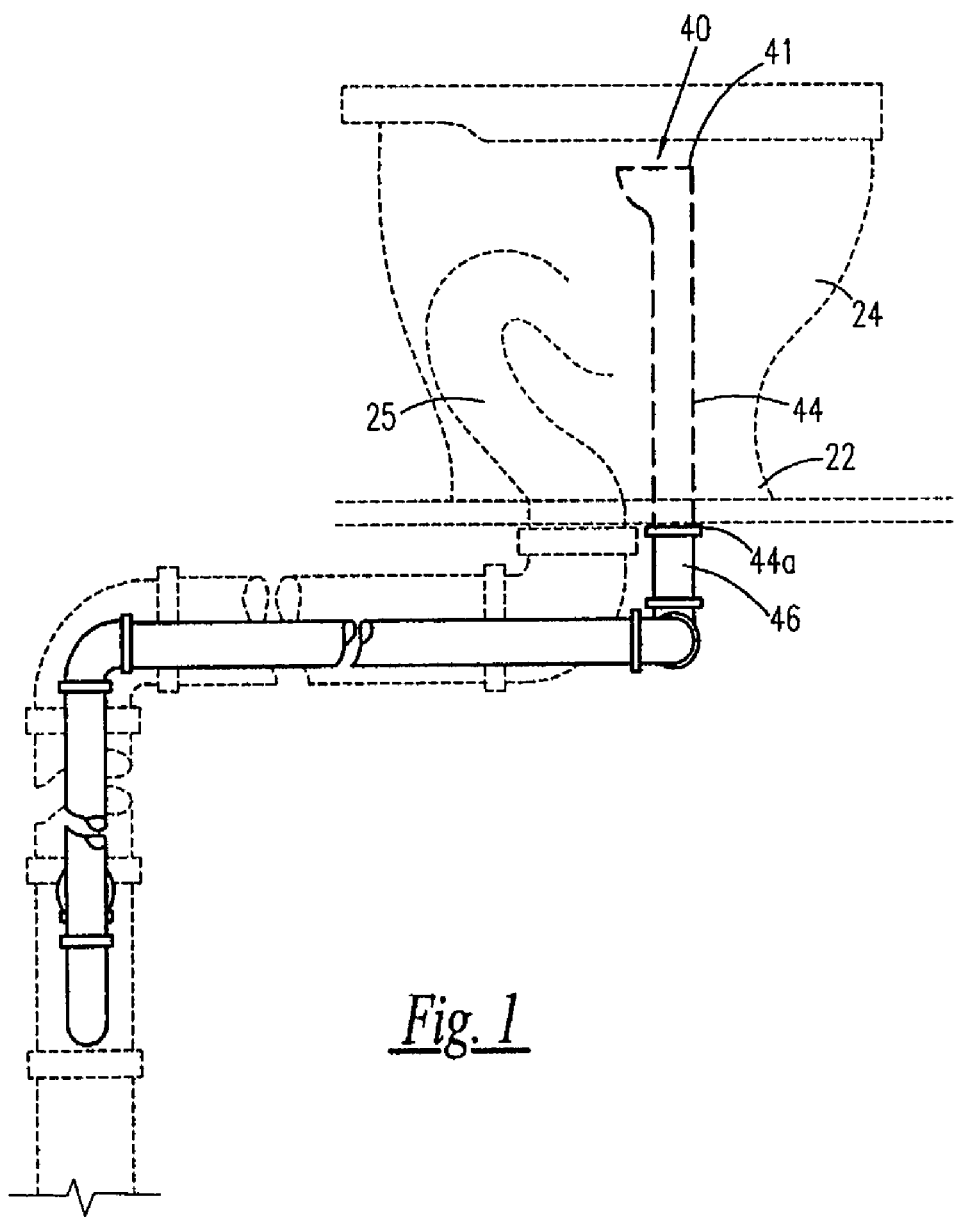
FIG. 1 is a left side elevational view of a toilet overflow prevention system according to the preferred embodiment of the present invention.
Figure 2:
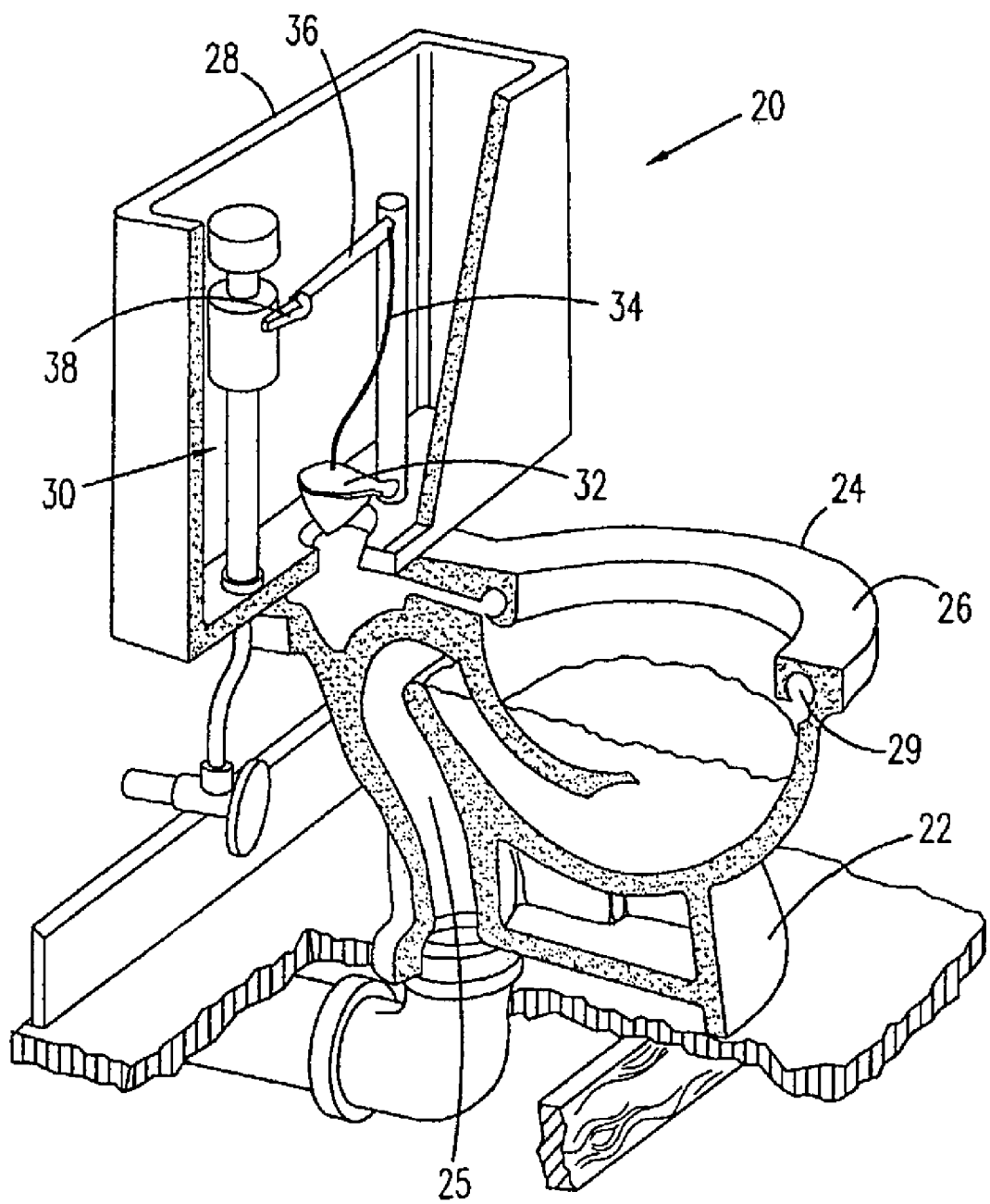
FIG. 2 is a partial cross-sectional view of a standard toilet shown illustrated as prior art.
Figure 3:
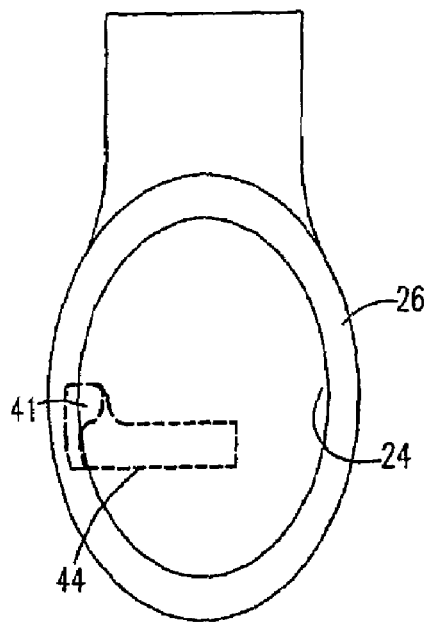
FIG. 3 is a top side view of the overflow inlet portal and auxiliary waste drain outlet according to the preferred embodiment of the present invention.
Figure 4:
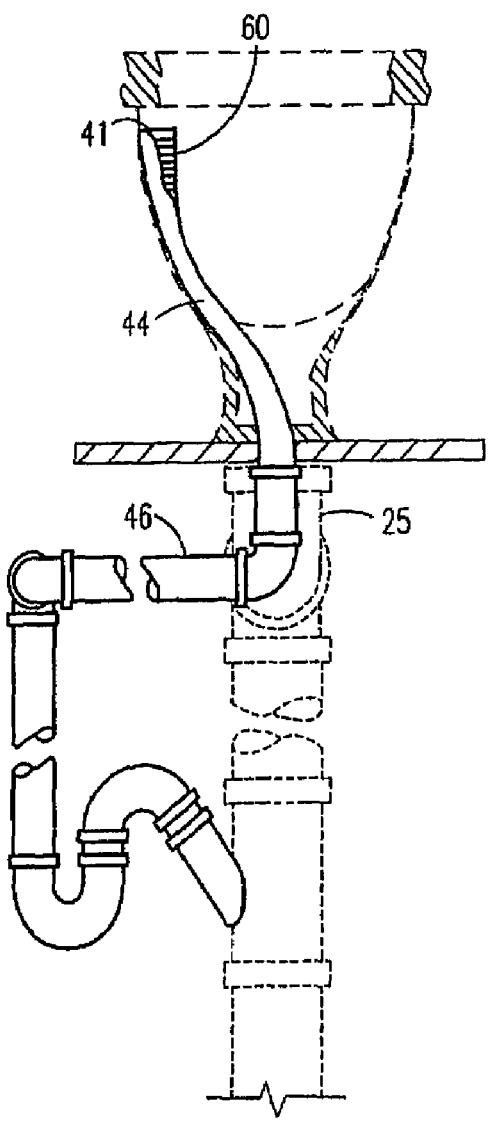
FIG. 4 is a front side partial cross-sectional view of the toilet overflow prevention system according to the preferred embodiment of the present invention.
Figure 5:
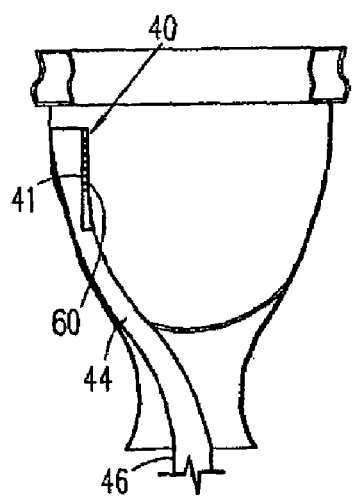
FIG. 5 is a front end view of the present invention illustrating the overflow inlet portal, the auxiliary waste drain outlet, and the reticulated grate element according to the referred embodiment of the present invention.

Referring now to FIGS. 1-5 a toilet overflow prevention system 10 is shown, according to the present invention, comprised of an otherwise standard toilet 20 which includes a stool 22, a toilet bowl 24, a toilet bowl rim 26 with tank 28 mounted thereon, and flush conduits 29 located inside toilet bowl 24 just below toilet bowl rim 26. Contents of toilet bowl 24 is expelled via standard flushing mechanism 27 through a primary waste discharge pipe 25. Standard flushing mechanism 30 includes a flapper valve 32 being pivotally movable between open and closed positions, whereupon in a closed position, flapper valve 32 effectively blocks water flow from tank 28. An end of a chain 34 is connected to flapper valve 32, wherein chain 34 has a lever 36 mounted at an opposed end thereof and a handle 38 is rotatably attached to lever 36 via pin 37. Downward force applied to handle 38 facilitates an upward pull of chain 34 by lever 36, in turn actuating flapper valve 32 to an open position, thereby allowing water within tank 28 to flow to toilet bowl 24 via outlet port 39 to flush contents thereof through the primary waste discharge pipe 25.

Referring more specifically to FIGS. 1, and 3-5, in order to 10 prevent the toilet bowl 24 from overflowing and flooding the lavatory area resulting in significant property damage as well as producing an unsanitary condition, an overflow inlet portal 40 is provided. The overflow inlet portal 40 is defined as a generally circular opening 41 integrally formed within the left side of the concave inner wall of the toilet bowl 24, at a level below the flush conduits 29, which provides passage to an auxiliary waste drain outlet 44. The circular opening 41 has a diameter measuring approximately 1.5 inches and is smoothly textured and contoured so as to facilitate swirling action of water upon contact therewith. Placement of overflow inlet portal 40 below the flush conduits 29 allows water to flow into auxiliary waste drain outlet 44 with each flush, thereby maintaining fresh water therein so as to prevent objectionable sewer gases from dissipating throughout the home.

The auxiliary waste drain outlet 44 extends downward through toilet bowl 24 frontal to primary waste discharge pipe 25, and through stool 22 under which connection is made to an auxiliary waste outlet piping 46 which is in fluid communication with primary waste discharge pipe 25. Connection between auxiliary waste drain outlet 44 and auxiliary waste outlet piping 46 is effectuated utilizing rubber gaskets 44a, fittings, and additional requisite components of proper configuration being adapted to prevent leakage between drain outlet 44 and outlet piping 46, as well as between outlet piping 46 and primary waste discharge pipe 25.

In order to trap debris contained within toilet bowl 24 as to facilitate ascension and discharge of water through auxiliary waste drain outlet 44 and hence prevent unpleasant overflow, a reticulated grate element 60 is provided. The reticulated grate element 60 is mounted transversely atop the circular opening 41.

2. Operation of the Preferred Embodiment

To use the present invention, user simply flushes the toilet with overflow system described herein in the traditional, ordinary manner.

The use of the present invention provides an effective means for preventing toilet overflow in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A toilet overflow prevention system comprising:
   a toilet having: a toilet bowl with a rim and flush conduits in the rim and a stool supporting the toilet bowl, the stool adapted to be mounted to a floor;
   an overflow inlet portal located in an upper portion of the toilet bowl below the flush conduits, wherein the overflow inlet portal is located above a regular water level in the toilet bowl, said overflow inlet portal comprising an opening integrally formed within a side of a concave inner wall of the toilet bowl, at a level below flush conduits thereof;
   a primary waste discharge pipe connected to the toilet bowl and extending out of the toilet through the stool through a bottom thereof;
   an auxiliary waste drain outlet connected to the overflow inlet portal and extending out of the toilet in fluid separation from the primary waste discharge pipe through the bottom of the stool, wherein said auxiliary waste drain outlet is in direct passage with said opening and wherein a location of said overflow inlet portal below the flush conduits allows water to flow into said auxiliary waste drain outlet with each flush, thereby maintaining fresh water therein; and
   auxiliary waste outlet piping connected to said auxiliary waste drain outlet and said primary waste discharge pipe outside the toilet.

2. The toilet overflow prevention system of claim 1, wherein said opening has a diameter measuring approximately 1.5 inches.

3. The toilet overflow prevention system of claim 1, further comprising a reticulated grate element, said reticulated grate element is mounted atop said opening in order to trap debris contained within the toilet bowl so as to facilitate ascension and discharge of water through said auxiliary waste drain outlet and hence prevent unpleasant overflow.

4. The toilet overflow prevention system of claim 1, wherein said auxiliary waste outlet piping is connected to said auxiliary waste drain outlet under the stool, and said auxiliary waste outlet piping is in fluid communication with the primary waste discharge pipe under the floor.

5. The toilet overflow prevention system of claim 4, wherein said auxiliary waste drain outlet and said auxiliary waste outlet piping are connected through utilization of at least one of a rubber gasket and fitting adapted to prevent leakage between said auxiliary waste drain outlet and said auxiliary waste outlet piping, and further comprising at least one of an additional rubber gasket and fitting adapted to prevent leakage between said auxiliary waste outlet piping and the primary waste discharge pipe.

6. The toilet overflow prevention system of claim 1, wherein the primary waste discharge pipe is in a rear portion of the stool and the auxiliary waste drain outlet is in a frontal portion of the toilet bowl stool.

7. A method for inhibiting toilet bowl overflow using a toilet overflow prevention system comprising:
- a toilet having: a toilet bowl with a rim and flush conduits in the rim and a stool supporting the toilet bowl, the stool adapted to be mounted to a floor;
- an overflow inlet portal located in an upper portion of the toilet bowl below the flush conduits, wherein the overflow inlet portal is located above a regular water level in the toilet bowl, said overflow inlet portal comprising an opening integrally formed within a side of a concave inner wall of the toilet bowl, at a level below flush conduits thereof;
- a primary waste discharge pipe connected to the toilet bowl and extending out of the toilet through the stool through a bottom thereof;
- an auxiliary waste drain outlet connected to the overflow inlet portal and extending out of the toilet in fluid separation from the primary waste discharge pipe through the bottom of the stool, wherein said auxiliary waste drain outlet is in direct passage with said opening and wherein a location of said overflow inlet portal below the flush conduits allows water to flow into said auxiliary waste drain outlet with each flush, thereby maintaining fresh water therein; and
- auxiliary waste outlet piping connected to said auxiliary waste drain outlet and said primary waste discharge pipe outside the toilet, wherein the method comprises:
- directing water through the overflow inlet portal located below the flush conduits and below the rim of the toilet bowl, wherein the overflow inlet portal is located above the regular water level and the water is directed through the overflow inlet portal when a water level rises due to clogging between the toilet bowl and the primary waste discharge pipe;
- maintaining fresh water in the auxiliary waste drain outlet by passing water from the flush conduits through the overflow inlet portal and into the auxiliary waste drain outlet with each flush, wherein the step of maintaining inhibits dissipation of objectionable sewer gases; and
- passing the water from the overflow inlet portal, through the auxiliary waste drain outlet and into the auxiliary waste outlet piping,
- wherein the auxiliary waste outlet piping exits a toilet stool at a location that is separate from the primary waste discharge pipe, and
- wherein the auxiliary waste outlet piping joins with the primary waste discharge pipe under a surface upon which the toilet stool is mounted.

\* \* \* \* \*